US011386590B1

United States Patent
Bonfiglio et al.

(10) Patent No.: US 11,386,590 B1
(45) Date of Patent: Jul. 12, 2022

(54) IN-APPLICATION ADJACENT COLOR CONTRAST DETECTION

(71) Applicant: OpenGov, Inc., Redwood City, CA (US)

(72) Inventors: Michael Bonfiglio, San Francisco, CA (US); Andrew Reder, Portland, OR (US); Seth McLeod, Portland, OR (US)

(73) Assignee: OPENGOV, INC., Redwood City, CA (US)

( * ) Notice: Subject to any disclaimer, the term of this patent is extended or adjusted under 35 U.S.C. 154(b) by 0 days.

(21) Appl. No.: 17/153,718

(22) Filed: Jan. 20, 2021

(51) Int. Cl.
| | |
|---|---|
| *G09G 5/02* | (2006.01) |
| *G06T 11/00* | (2006.01) |
| *H04N 1/60* | (2006.01) |
| *H04N 5/57* | (2006.01) |
| *H04N 9/64* | (2006.01) |
| *H04N 9/77* | (2006.01) |

(52) U.S. Cl.
CPC ............. *G06T 11/001* (2013.01); *G09G 5/02* (2013.01); *G09G 2320/0666* (2013.01); *G09G 2354/00* (2013.01); *G09G 2360/16* (2013.01)

(58) Field of Classification Search
CPC combination set(s) only.
See application file for complete search history.

(56) References Cited

U.S. PATENT DOCUMENTS

| | | | | |
|---|---|---|---|---|
| 10,878,540 | B1 * | 12/2020 | Stevens | G09G 5/026 |
| 2003/0174866 | A1 * | 9/2003 | Poynter | G09G 5/06 382/114 |
| 2009/0263016 | A1 * | 10/2009 | Kuo | H04N 1/6027 382/167 |
| 2011/0074807 | A1 * | 3/2011 | Inada | G06T 11/001 345/589 |
| 2013/0235069 | A1 * | 9/2013 | Ubillos | G09G 5/026 345/594 |
| 2019/0213071 | A1 * | 7/2019 | Anand | G06T 7/00 |
| 2020/0219296 | A1 * | 7/2020 | Baldwin | G06T 11/001 |

\* cited by examiner

*Primary Examiner* — Wesner Sajous

(74) *Attorney, Agent, or Firm* — Patterson + Sheridan LLP

(57) ABSTRACT

Methods and systems disclosed relate to color controls for visual accessibility within applications. Within a content editor of an application, a user may choose one or more colors for a content element. Upon choosing the color for the content element, a color control generates a contrast ratio between the chosen color of the content element and a background color upon which the content element may be seen. If a contrast ratio is not met or exceeded, an indicator is provided to a user. In some embodiments, the color control may further recommend an accessible color to the user in place of the chosen color, such that the contrast ratio between the accessible color and the background color meets or exceeds the threshold.

20 Claims, 4 Drawing Sheets

US 11,386,590 B1

IN-APPLICATION ADJACENT COLOR CONTRAST DETECTION

INTRODUCTION

Aspects of the present disclosure relate to color controls for an application, and more particularly, to a graphical user interface for detecting and reporting contrast ratio of adjacent color elements in an application.

A wide variety of applications provide a user with the ability to modify graphical element colors. For example, reporting, graphical design, web page creation, business management, project management, word processors, and spreadsheets provide basic, if any, tools for to modify colors of different elements. Using these tools, users are able to modify colors of elements in an application such as text, chart elements, and background.

However, for purposes of accessibility to people with different visual capabilities, colors should be chosen to have sufficient contrast between adjacent colors. Conventionally, to determine if two adjacent colors are of sufficient contrast, such as between a graphical element of a report and the report background, the user leaves the application to open an external app, copy the colors (or a representation of the colors such as a hex or RGB code) into the external app, and the external app will indicate a contrast ratio. This conventional approach requires the acquisition of additional apps, takes time, and breaks a user out of the workflow of the original application, taking additional person-time to re-enter that workflow. Moreover, colors being compared may not be accurately transcribed to the external app, potentially resulting in a faulty comparison.

What is needed are methods and systems to overcome the deficiencies of conventional approaches.

BRIEF SUMMARY

Certain embodiments provide a method for controlling color in an application, including receiving at an application comprising a background color, a command to open a content editing tool of the application in a context of a graphical element of the application, receiving at the content editing tool, a color selection for the graphical element comprising a foreground color, and calculating a first contrast ratio between the background color and the foreground color. Further embodiments include comparing the first contrast ratio to a contrast ratio threshold and displaying, in the content editing tool, an indication that the first contrast ratio is greater than or less than the contrast ratio threshold.

Other embodiments provide processing systems configured to perform the aforementioned methods as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
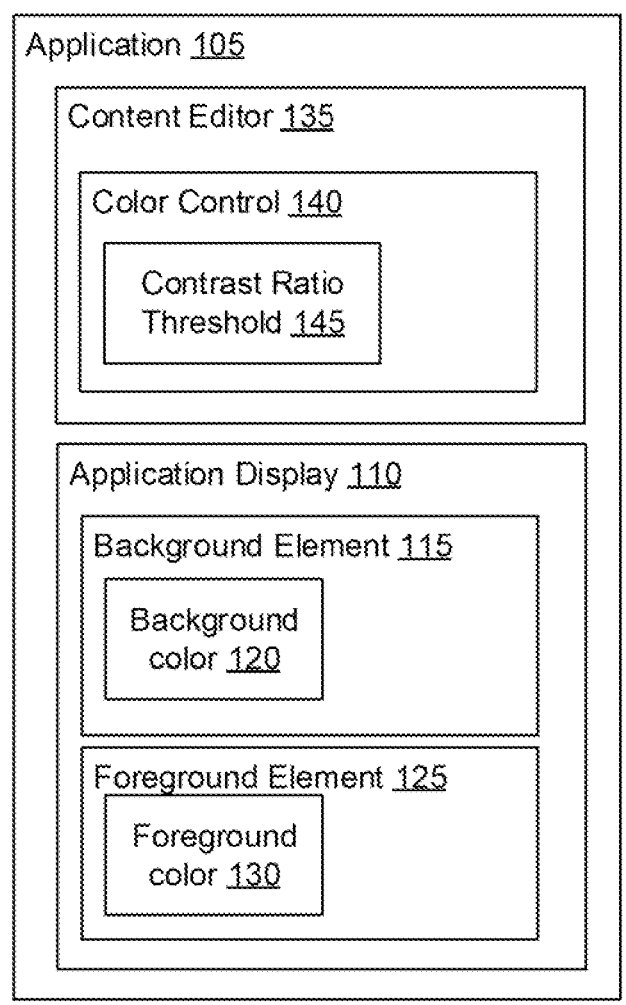
FIG. 1 depicts a system for color control of an application, according to certain embodiments.

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, a reference to "the disclosure" shall not be construed as a generalization of any inventive subject matter disclosed herein and shall not be considered to be an element or limitation of the appended claims except where explicitly recited in a claim(s).

Aspects of the present disclosure provide apparatuses, methods, processing systems, and computer-readable mediums for in-application detection of contrast of adjacent colors, for example, for visual accessibility within applications. In some embodiments, a content editor of an application enables a user to choose one or more colors for a content element. Upon choosing the color for the content element, a color control generates a contrast ratio between the chosen color of the content element and an adjacent color. If a contrast ratio threshold is not met or exceeded, an indicator is provided to a user. In some embodiments, the color control may further recommend a higher contrast color to the user in place of the chosen color, such that the contrast ratio between the chosen color and the background color meets or exceeds the threshold.

Visual elements of an application typically have different colors both for their decorative value and to create a visual distinction between the elements. A background element having a background color may serve as a backdrop for a foreground element that, in turn, has a foreground color. Visual distinction between these elements are created at the borders where they meet, and the contrast between foreground and background color determines how easily a viewer may distinguish between the foreground and background elements.

In this context, "foreground" and "background" elements are meant to distinguish between different visual elements within the application. The germane relationship between these elements is the the contrast ratio of the colors of the foreground and background elements, where the contrast between the colors of each element may be a determining factor of visual distinction between the elements. In certain embodiments, the foreground and background elements are adjacent to each other, while in other embodiments there may be separation between them, such as by a border. A background element in this context need not necessarily extend behind/underneath a foreground element. The background and foreground element are distinct visual elements within an application display, either adjacent to one another or with separation between them.

The visual distinction between the colors of the foreground and background element may be determined by the contrast between the colors. A contrast of color may, in some embodiments, be determined by the luminescence of the color. As for determining the contrast between two colors, a contrast ratio may be determined. For visual accessibility standards, such as those defined by the Web Content and Accessibility Guidelines (WCAG), a content industry-standard promulgated by World Wide Web Consortium (W3C), a contrast ratio of 3:1, for adjoining colors of non-text elements, and 7:1 for text and its background. A contrast ratio(s) for a desired visual distinctiveness between application visual elements may be chosen based on developer goals for the application, that may be related to WCAG accessibility or other standards.

Conventionally, when choosing a color for an element in an application, a user chooses the color, but then leaves the application to invoke an external application to compare the contrast of the chosen color to another color (such as application background or other visual elements). Embodiments described herein overcome conventional methods by providing a content editing functionality, including color choice options and contrast ratio between two elements, and indicating to a user if the contrast ratio meets or exceeds a threshold. In some embodiments, the threshold may be based on an accessibility contrast ratio requirement or standard.

Providing contrast ratio generation and threshold indication in the same application in which compared visual elements are creaded and/or edited provides many advantages over conventional approaches. Comparing colors within the same application avoids the need to translate colors between applications, making such comparisons more accurate. Fewer software tools are needed, saving time and cost to acquire additional tools. Users are more productive as color comparison occurs in the workflow of the application, without the need to change contexts and copy colors over to an external application. Moreover, user who receives an indication that the contrast ratio of colors of two elements is insufficient within the application where the elements are being edited may use the same content editor to change the color of one element (or both) immediately without shifting attention to another application, resulting in accurate color selection to meet contrast requirements, by avoiding color translation between different applications.

Example System for Color Control

FIG. 1 depicts a system 100 for color control of an application, according to certain embodiments. System 100 includes an application 105. Application 105 may include any type of application having the functionality for a user to change the color of one or more elements of the application 105. Examples of applications having this functionality include process management, graphical design, reporting, and other applications in which a user may choose a visual element of the application 105 and modify its color. For example, in an application enabling a user to develop a bar chart for financial reporting, the functionality may be provided to enable a user to select a bar of a bar chart, or a stacked portion of a contiguous bar, and modify the color of the selected portion. In this context, application 105 includes an application display 110 that provides a visual interface for a user to view and interact with elements of the application 105.

Within application display 110 various visual elements of the application 105 are viewable by a user. Application 105 has one or more background elements 115, with each background element 115 having a background color 120; a background element 115 may be of any shape desired by the application developer or for the end-user. Application display 110 further includes one or more foreground elements 125 that visually appear over the background element 115. Each foreground element 125 can be of any shape desired by the application developer or the end-user and has a foreground color 130. In this context, a foreground element 125 will have one or more corresponding background elements 115 for which the background color 120 will be visually adjacent to the foreground color 130 of the foreground element 125.

Visual adjacency in this regard may exist anywhere a foreground color 130 of a foreground element 125 is visually adjacent to a background color 120 of a background element 115. Visual adjacency in this context may include the foreground color 130 directly adjacent (e.g., touching) the background color 120, as well as a border separating the foreground color 130 and background color 120.

In some embodiments, there may be more than one background color 120, for example, when there are more than one background colors 120 visually adjacent to the foreground color 130, and one or more background colors 120 are semi-transparent. In these embodiments, the background color 120 will be a combination of background colors based on color and transparency of background colors. Similarly, there may be more than one color that make up the foreground color 130.

For example, in a report generation application, an example of background element 115 may be a visual "page" (e.g., a white rectangular shape) upon which a user provides text that is an example of foreground element 125, and one or more charts. In examples where a chart is an example of foreground element 125, the "page" may be an example of the background element 115 upon which the chart is viewed. A chart may be an example of a background element 115, for which a bar of a bar chart may be an example of a foreground element 125. A border of a bar chart on the visual page background element 115 of the application may be an example of a foreground element 125.

When a user chooses the element to modify its color, such as foreground element 125, she has an option to invoke a content editor 135. Content editor 135 includes functionality enabling the user to choose one or more colors for the foreground element 125. Conventionally, a color palette may be provided, displaying various available color options. In some embodiments, a "color picker" may be provided, enabling the user to choose a color of any visual element available in a display of the user's computing device. In addition to providing a visual depiction of available colors, each color option includes one or more numerical values associated with the color, such as Red Green Blue (RGB) value, hexadecimal value, Hue Saturation Lightness (HSL) value, Cyan Magenta Yellow Black (CMYK) value, long format value, or other value that may identify an individual color now known or later developed.

Content editor 135 comprises color control 140 for determining the contrast ratio between the foreground color 130 and the background color 120 and compares the contrast ratio to a contrast ratio threshold 145. In certain embodiments, color control 140 determines a luminance value for each color (described in connection with FIG. 2) by using RGB values for the background color 120 and foreground color 130. The contrast ratio between these colors is a relative luminance value of the lighter of the two colors over (in the numerator position) the relative luminance of the darker of the two colors (in the denominator position).

Example Flow Diagram for Determining Contrast Ratio

Figure 2:
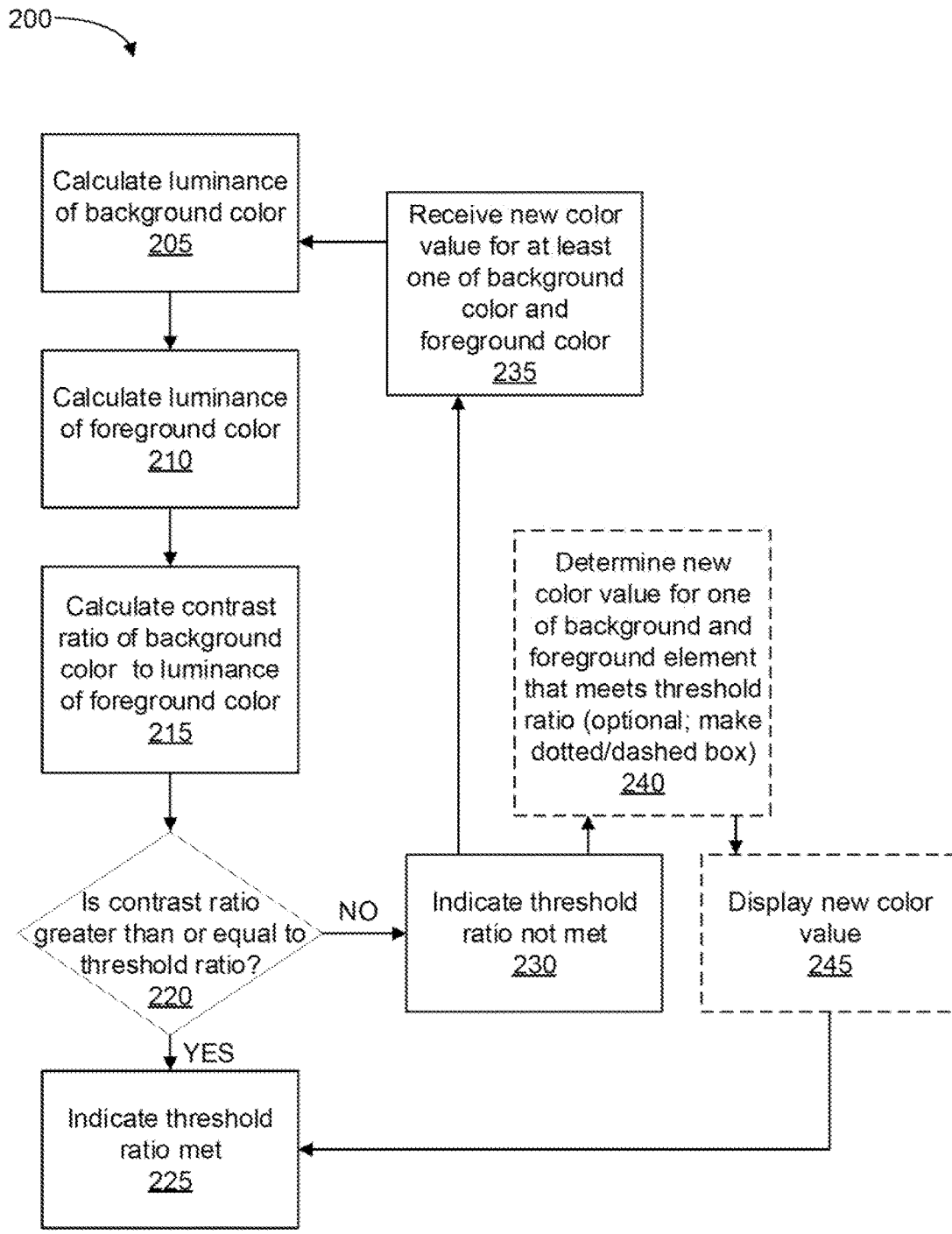
FIG. 2 depicts a flow diagram for comparing contrasts of adjacent colors, according to certain embodiments.

FIG. 2 depicts a flow diagram 200 for comparing the contrast of adjacent colors such as background color 120 and foreground color 130, according to certain embodiments. In certain embodiments, to compare the contrast of adjacent colors of the foreground color 130 and background color 120, a luminance value is calculated for each color and then expressed as a contrast ratio, or relative luminance.

At 205 the flow diagram 200 calculates a luminance value for background color, such as background color 120. According to certain embodiments, the luminance of the background color may be calculated by the following:

$$L_B = 0.2126 * R_B + 0.7152 * G_B + 0.07022 * B_B \text{ where}$$
$$R_B, G_B, \text{ and } B_B \text{ are defined as:}$$

if RBKG<=0.3928 then RB=RBKG/12/92 else RB=$(((RBKG+0.055)/1.055)^{2.4}$ if GBKG<=0.3928 then GB=RBKG/12/92 else GB=$(((GBKG+0.055)/1.055)\ 2.4$ if BBKG<=0.3928 then BB=BBKG/12/92 else BB=$(((BBKG+0.055)/1.055)\ 2.4$ where:
$L_B$=Luminance of background color
$R_B$=Red value of background color
$G_B$=Green value of background color
$B_B$=Blue value of background color
$R_{BKG}$=Red RGB value of background color
$G_{BKG}$=Green RGB value of background color
$B_{BKG}$=Blue RGB value of background color At 210 the flow diagram 200 calculates a luminance value for a foreground color, such as foreground color 130, adjacent to the background color. According to certain embodiments, the luminance of the foreground color may be calculated by the following (for example, see WCAG Technique G17 for Accessibility):

$$L_F = 0.2126 * R_F + 0.7152 * G_F + 0.07022 * B_F \text{ where}$$
$$R_F, G_F, \text{ and } B_{FB} \text{ are defined as:}$$

if $R_{FG}$<=0.3928 then $R_F$=$R_{FG}$/12/92 else $R_F$=$(((R_{FG}+0.055)/1.055)^{2.4}$ if $G_{FG}$<=0.3928 then $G_F$=$R_{FG}$/12/92 else $G_F$=$(((G_{FG}+0.055)/1.055)^{2.4}$ if $B_{FG}$<=0.3928 then $B_F$=$B_{FG}$/12/92 else $B_F$=$(((B_{FG}+0.055)/1.055)^{2.4}$ where:
$L_F$=Luminance of foreground color
$R_F$=Red value of foreground color
$G_F$=Green value of foreground color
$B_F$=Blue value of foreground color
$R_{FG}$=Red RGB value of foreground color
$G_{FG}$=Green RGB value of foreground color
$B_{FG}$=Blue RGB value of foreground color Although RGB values are used above for the example calculation of the luminance values for the background color and foreground color, one of skill in the art will understand that other color value types may be utilized, such as HSL and CMYK color values.

At 215 the relative luminance of the background color to the foreground color is calculated as follows:

$$(L1+0.05)/(L2+0.05), \text{ where:}$$

L1 is the luminance of the lighter of the foreground color and the background color; and L2 is the luminance of the darker of the foreground color and the background color. Relative luminance, also called contrast ratio herein, may be expressed as L1:L2.

At 220, it is determined whether or not the contrast ratio is greater than or equal to a threshold ratio. In embodiments comparing the luminance of text to that of an adjacent color (such as a background behind the text), the threshold ratio may be 7:1, for example, for visual accessibility. In embodiments comparing the luminance of an element such as a bar element of a bar chart to that of an adjacent color (such as background behind the bar element or an adjacent bar in the bar chart), the threshold ratio may be 4:1 for example, for visual accessibility.

If the determination at 220 is YES, the flow diagram 200 proceeds to 225, providing an indicator that the threshold ratio has at least been met. Such indication may be that the ratio is "accessible" for compliance with accessibility guidelines or any other message indicating that the desired ratio has been met (or exceeded).

If the determination at 220 is NO, the flow diagram 200 proceeds to 230, indicating that the threshold ratio has not at least been met. In some embodiments, such an indication maybe be that the ratio is "not accessible" for compliance with accessibility guidelines, or other messages indicating that the desired ratio has not been met.

After indicating that the ratio has not been met, the flow diagram 200 proceeds to 235, seeking a new color value for at least one of the background color and foreground color, before proceeding to 205.

As an option, after indicating that the threshold ratio has not been met at 230, the flow diagram may proceed to 240. At 240, the flow diagram determines a new color value for one of the background color and foreground color that meets (or exceeds) the threshold ratio.

Also optional, once the new color has been determined at 240, the flow diagram proceeds to display the new color value at 245.

Example Method for Color Control

Figure 3:
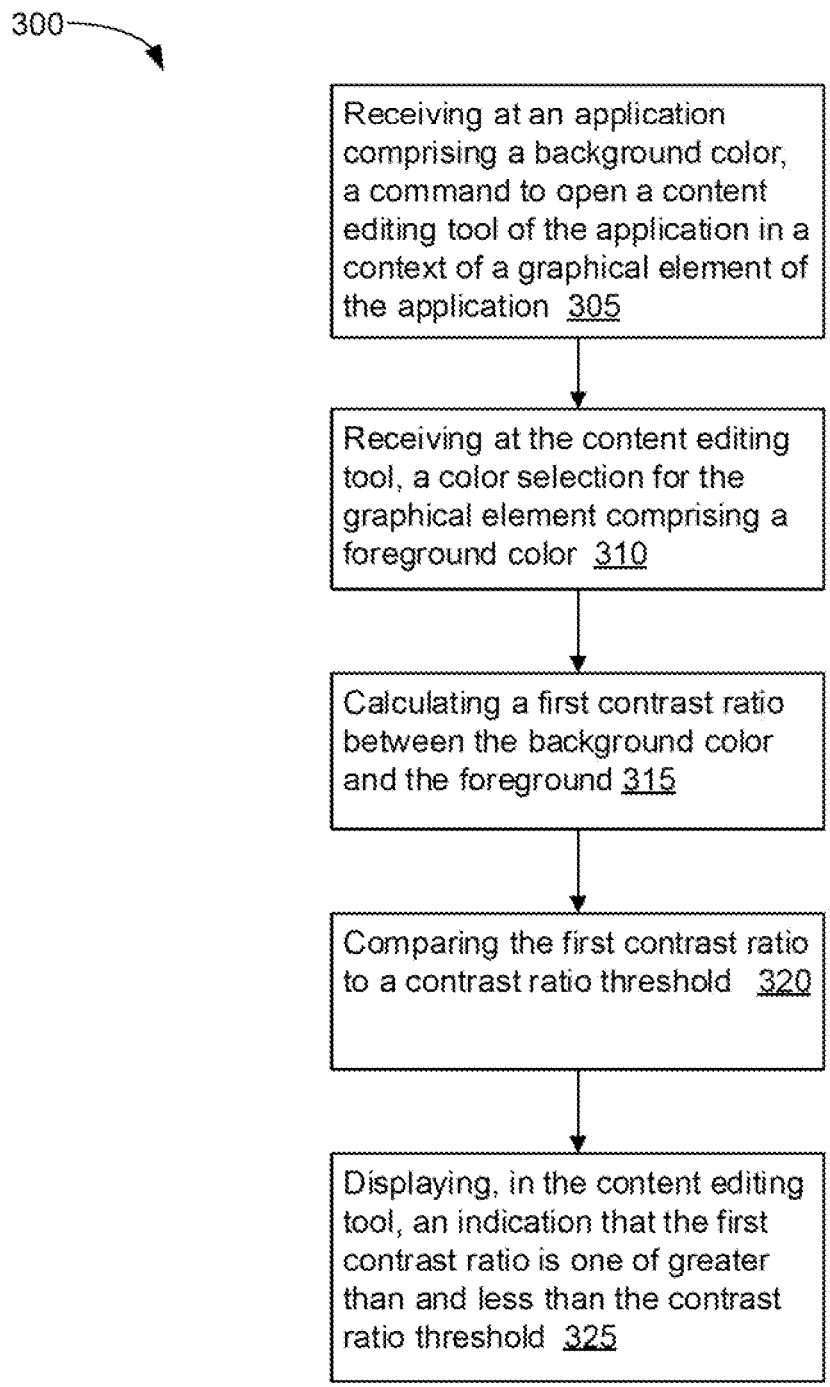
FIG. 3 depicts a method for color control in an application, according to certain embodiments.

FIG. 3 depicts a method 300 for color control in an application, according to certain embodiments.

At 305, the method 300 receives at an application comprising a background color, a command to open a content editing tool of the application in a context of a graphical element of the application.

At 310, the method receives at the content editing tool a color selection for the graphical element comprising a foreground color.

At 315, the method calculates a first contrast ratio between the background color and the foreground color. In certain embodiments, the method 300 comprises measuring a relative luminance of the foreground color and relative luminance of the background color. In certain embodiments, the background color and foreground color are adjacent to each other. In further embodiments, the background color is a color of a second graphical element of the application.

At 320, the method compares the first contrast ratio to a contrast ratio threshold, and at 325 the method displays, in the content editing tool, an indication that the first contrast ratio is one of greater than and less than the contrast ratio threshold. In certain embodiments, a recommended color or range of colors for the graphical element is displayed. In embodiments providing a recommended color or colors, recommending comprises determining a luminance of a plurality of colors relative to the luminance of the background color and setting the recommended color as one or more of the plurality of colors having a luminance relative to the luminance of the background color above the contrast ratio threshold.

In some embodiments, method 300 further comprises obtaining the contrast ratio threshold from a policy configuration of a tenant of a cloud hosting platform provisioned to host the application.

Example System for Color Control

Figure 4:
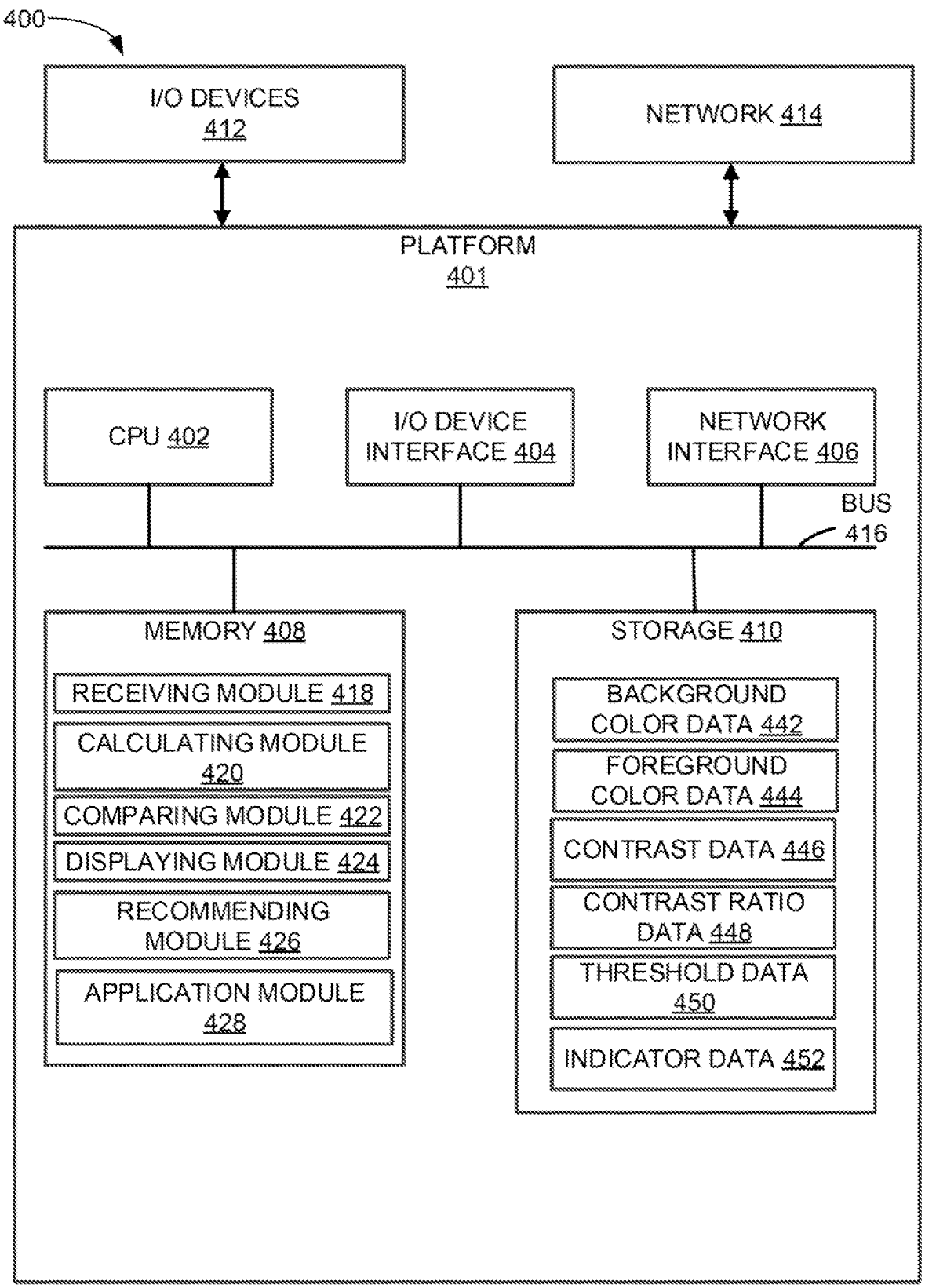
FIG. 4 depicts a system for color control in an application, according to certain embodiments.

FIG. 4 depicts a system 400 for color control in an application, according to certain embodiments, that may perform the methods described herein, such as the flow diagram for comparing the contrast of adjacent colors described with respect to FIG. 2, and the method for color control in an application described with respect to FIG. 3.

Platform 401 includes a central processing unit (CPU) 402 connected to a bus 416. CPU 402 is configured to process computer-executable instructions, e.g., stored in memory 408 or storage 410, and to cause the platform 401 to perform methods described herein, for example, with respect to FIGS. 2 and 3. CPU 402 is included to be representative of a single CPU, multiple CPUs, a single CPU having multiple processing cores, and other forms of processing architecture capable of executing computer-executable instructions.

System 400 further includes input/output (I/O) device(s) 412 and interfaces 404, which allows platform 401 to interface with input/output devices 412, such as, for example, keyboards, displays, mouse devices, pen input, and other devices that allow for interaction with platform 401. Note that platform 401 may connect with external I/O devices through physical and wireless connections (e.g., an external display device).

Platform 401 further includes a network interface 406, which provides platform 401 with access to external network 414 and thereby external computing devices.

Platform 401 further includes memory 408, which in this example includes a receiving module 418, calculating module 420, comparing module 422, displaying module 424, recommending module 426, and application module 428 for performing operations described in FIGS. 2 and 3. While not depicted, other aspects consistent with those described herein may be included in memory 408.

Note that while shown as a single memory 408 in FIG. 4 for simplicity, the various aspects stored in memory 408 may be stored in different physical memories, including memories remote from platform 401, but all accessible by CPU 402 via internal data connections such as bus 416.

Storage 410 further includes background color data 442, which may be like the background color described in connection with FIGS. 1-3.

Storage 410 further includes foreground color data 444, which may be like the foreground color described in connection with FIGS. 1-3.

Storage 410 further includes contrast data 446, which may be like contrast described in connection with FIGS. 1-3.

Storage 410 further includes contrast ratio data 448, which may be like contrast ratios described in connection with FIGS. 1-3.

Storage 410 further includes threshold data 450, which may be like thresholds described in connection with FIGS. 1-3.

Storage 410 further includes indicator data 452, which may be like indicators described in connection with FIGS. 1-3.

While not depicted in FIG. 4, other aspects may be included in storage 410.

As with memory 408, a single storage 410 is depicted in FIG. 4 for simplicity, but various aspects stored in storage 410 may be stored in different physical storages, but all accessible to CPU 402 via internal data connections, such as bus 416, or external connection, such as network interfaces 406. One of skill in the art will appreciate that one or more elements of platform 401 may be located remotely and accessed via a network 414.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for controlling color in an application, comprising:
   receiving at an application comprising a background color, a command to open a content editing tool of the application in a context of a graphical element of the application;
   receiving at the content editing tool, a color selection for the graphical element comprising a foreground color;
   calculating a first contrast ratio between the background color and the foreground color;
   comparing the first contrast ratio to a contrast ratio threshold;
   displaying, in the content editing tool, an indication that the first contrast ratio is greater than or less than the contrast ratio threshold; and
   displaying a recommended color for the graphical element, further comprising:
      determining a luminance of a plurality of colors relative to the luminance of the background color; and
      setting the recommended color as one or more of the plurality of colors having a contrast ratio relative to the background color above the contrast ratio threshold.

2. The method of claim 1, further comprising obtaining the contrast ratio threshold from a policy configuration of a tenant of a cloud hosting platform provisioned to host the application.

3. The method of claim 1, wherein calculating the first contrast ratio comprises measuring a relative luminance of the color selection and relative luminance of the background color.

4. The method of claim 3, wherein the background color and the foreground color are adjacent to each other.

5. The method of claim 3, wherein the background color is a color of a second graphical element of the application.

6. A system comprising:
   a memory comprising executable instructions for controlling color in an application; and
   a processor configured to execute the executable instructions and cause the system to:
      receive at an application comprising a background color, a command to open a content editing tool of the application in a context of a graphical element of the application;
      receive at the content editing tool, a color selection for the graphical element comprising a foreground color;
      calculate a first contrast ratio between the background color and the foreground color;
      compare the first contrast ratio to a contrast ratio threshold;
      display, in the content editing tool, an indication that the first contrast ratio is one of greater than or less than the contrast ratio threshold; and
      display a recommended color for the graphical element, wherein in order to display the recommended color for the graphical element, the processor is configured to cause the system to further:
         determine a luminance of a plurality of colors relative to the luminance of the background color; and
         set the recommended color as one or more of the plurality of colors having a contrast ratio relative to the background color above the contrast ratio threshold.

7. The system of claim 6, wherein the processor is further configured to cause system to obtain the contrast ratio threshold from a policy configuration of a tenant of a cloud hosting platform provisioned to host the application.

8. The system of claim 6, wherein in order to calculate the first contrast ratio, processor is further configured to cause the system to measure a relative luminance of the color selection and relative luminance of the background color.

9. The system of claim 8, wherein the background color and the foreground color are adjacent to each other.

10. The system of claim 8, wherein the background color is a color of a second graphical element of the application.

11. A method for controlling color in an application, comprising:
   receiving at an application comprising a background color, a command to open a content editing tool of the application in a context of a graphical element of the application;
   receiving at the content editing tool, a color selection for the graphical element comprising a foreground color;
   calculating a first contrast ratio between the background color and the foreground color, further comprising measuring a relative luminance of the color selection and a relative luminance of the background color;

comparing the first contrast ratio to a contrast ratio threshold; and displaying, in the content editing tool, an indication that the first contrast ratio is greater than or less than the contrast ratio threshold.

12. The method of claim 11, further comprising obtaining the contrast ratio threshold from a policy configuration of a tenant of a cloud hosting platform provisioned to host the application.

13. The method of claim 11, wherein the background color and the foreground color are adjacent to each other.

14. The method of claim 11, wherein the background color is a color of a second graphical element of the application.

15. The method of claim 11, further comprising displaying a recommended color for the graphical element.

16. The method of claim 15, wherein displaying a recommended color for the graphical element further comprises:

determining a luminance of a plurality of colors relative to the luminance of the background color; and setting the recommended color as one or more of the plurality of colors having a contrast ratio relative to the background color above the contrast ratio threshold.

17. The method of claim 1, wherein the color selection is determined by a user.

18. The method of claim 3, wherein the background color and the foreground color are visually adjacent.

19. The system of claim 6, wherein the color selection is determined by a user.

20. The method of claim 11, wherein the color selection is determined by a user.

* * * * *